(12) United States Patent
Cho et al.

(10) Patent No.: US 9,092,064 B2
(45) Date of Patent: Jul. 28, 2015

(54) HEAD MOUNTED DISPLAY AND METHOD OF CONTROLLING THEREFOR

(71) Applicant: LG ELECTRONICS INC., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 14/158,500

(22) Filed: Jan. 17, 2014

(65) Prior Publication Data

US 2015/0130699 A1    May 14, 2015

(30) Foreign Application Priority Data

Nov. 11, 2013    (KR) .......................... 10-2013-0136148

(51) Int. Cl.
  *G09G 5/00*   (2006.01)
  *G06F 3/01*   (2006.01)
  *G02B 27/01*  (2006.01)
  *G06T 19/00*  (2011.01)

(52) U.S. Cl.
  CPC .............. *G06F 3/017* (2013.01); *G02B 27/017* (2013.01); *G02B 27/0172* (2013.01); *G06F 3/016* (2013.01); *G06T 19/00* (2013.01)

(58) Field of Classification Search
  None
  See application file for complete search history.

(56) References Cited

U.S. PATENT DOCUMENTS

| 2004/0090444 | A1* | 5/2004 | Satoh ............................ 345/633 |
| 2007/0258658 | A1* | 11/2007 | Kobayashi et al. ............ 382/276 |
| 2011/0211092 | A1* | 9/2011 | Sakaue et al. ................ 348/231.3 |
| 2012/0306725 | A1 | 12/2012 | Hilkes |
| 2013/0302007 | A1* | 11/2013 | Lee et al. ....................... 386/227 |

FOREIGN PATENT DOCUMENTS

| JP | 8-279935 A | 10/1996 |
| JP | 9-289611 A | 11/1997 |
| JP | 2007-333929 A | 12/2007 |
| JP | 2013-30122 A | 2/2013 |

* cited by examiner

*Primary Examiner* — Muhammad N Edun
(74) *Attorney, Agent, or Firm* — Birch, Stewart, Kolasch & Birch, LLP

(57) ABSTRACT

The present specification relates to a head mounted display and a method of controlling therefor, and more particularly, when a user wearing the head mounted display captures an image, a method of storing a captured image according to whether a preview via an image preview interface exists or not.

20 Claims, 11 Drawing Sheets

(b)

(a)

(a)

(b)

HEAD MOUNTED DISPLAY AND METHOD OF CONTROLLING THEREFOR

Pursuant to 35 U.S.C. §119(a), this application claims the benefit of the Korean Patent Application No. 10-2013-0136148, filed on Nov. 11, 2013, which is hereby incorporated by reference as if fully set forth herein.

BACKGROUND OF THE INVENTION

1. Field of the Invention

The present specification relates to a head mounted display and a method of controlling therefor, and more particularly, when a user wearing the head mounted display captures an image, a method of storing a captured image according to whether a preview via an image preview interface exists or not.

2. Discussion of the Related Art

Generally, a head mounted display (hereinafter abbreviated HMD) indicates various digital devices enabling a user to receive a multimedia content in a manner of being mounted on the head of the user like glasses. According to a trend of lightening and miniaturizing of a digital device, various wearable computers have been developed so far and the HMD is also widely used. The HMD can provide various conveniences as well as a simple display function to a user in a manner of being combined with an augmented reality technology, an N screen technology, and the like.

For instance, if a microphone and a speaker are installed in the HMD, a user can easily make a call while wearing the HMD. And, for instance, if a camera is installed in the HMD, the user can easily capture an image of a preferred direction while wearing the HMD.

SUMMARY OF THE INVENTION

Accordingly, the present specification is directed to an apparatus and method thereof that substantially obviate one or more problems due to limitations and disadvantages of the related art.

As one embodiment, when an image is captured in a state that a preview is provided to a user wearing the HMD, the present specification intends to provide a method of storing the captured image as it is irrespective of a horizontal rotation angle of the HMD.

As a different embodiment, when an image is captured in a state that a preview is not provided to a user wearing the HMD, the present specification intends to provide a method of storing a rotation-compensated image in response to a horizontal rotation angle.

As a different embodiment, when the HMD stores an image captured in a horizontally rotated state without performing rotation compensation, the present specification intends to provide a method of restoring the image performed by the rotation compensation again by an input signal of a user.

As a further different embodiment, when the HMD stores an image captured in a horizontally rotated state performed by rotation compensation, the present specification intends to provide a method of restoring the image in a manner of cancelling the rotation compensation by an input signal of a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a head mounted display (HMD) includes a display unit configured to display visual information, a camera unit configured to sense an image, an angle sensing unit configured to sense a rotation angle of the camera unit, an input sensing unit configured to detect an input signal and transmit a detected result to a processor, and the processor configured to control the display unit, the camera unit, the angle sensing unit, and the input sensing unit, wherein the processor is further configured to detect a capturing signal, store a sensed image without performing rotation compensation if mode corresponds to first capturing mode, wherein the first capturing mode corresponds to a mode providing an image preview interface, and store the sensed image performed by the rotation compensation if mode corresponds to second capturing mode, wherein the second capturing mode corresponds to a mode not providing the image preview interface.

In another embodiment, a method of controlling a head mounted display (HMD) includes the steps of detecting a capturing signal, storing a sensed image without performing rotation compensation a mode corresponds to a first capturing mode, wherein the first capturing mode corresponds to a mode providing an image preview interface, and storing the sensed image performed by the rotation compensation if mode corresponds to a second capturing mode wherein the second capturing mode corresponds to a mode not providing the image preview interface.

According to one embodiment, when a user wearing the HMD captures an image, if the user can recognize the image sensed by a preview, the HMD stores the image sensed in a state of being inclined as it is and provides the image to the user.

According to a different embodiment, when a user wearing the HMD captures an image, if the user captures the image without a preview, the HMD can provide a horizontal image to the user.

According to a different embodiment, when a user captures an image in a state that the HMD is horizontally inclined, although the user stores the captured image without performing rotation compensation, the HMD can restore the image performed by the rotation compensation for the stored image by a selection of the user.

According to a further different embodiment, when a user captures an image in a state that the HMD is horizontally inclined, although the user stores the captured image by performing rotation compensation, the HMD can restore the image in a manner of cancelling the rotation compensation for the stored image by a selection of the user.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
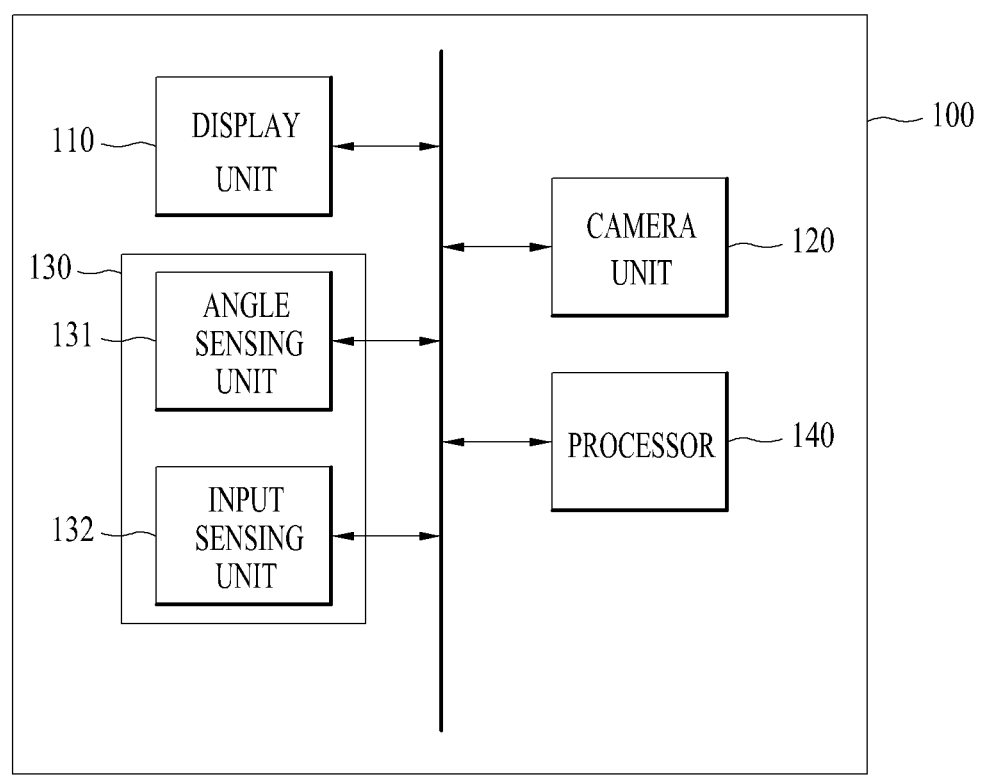
FIG. 1 is a block diagram of a head mounted display (HMD) according to the present specification.

FIG. 1 is a block diagram of a head mounted display (HMD) according to the present specification. Yet, FIG. 1 is just one embodiment and a part of configuring module can be deleted or a new configuring module can be added according to the necessity of those skilled in the art.

As depicted in FIG. 1, an HMD 100 according to one embodiment can include a display unit 110, a camera unit 120, a sensing unit 130, and a processor 140.

The display unit 110 can display visual information. In this case, the visual information can include content, an application, an image, a video, and the like. And, the display unit 110 can output the visual information in a screen based on a control command of the processor 140.

Meanwhile, in the present specification, the HMD 100 can output an image in the display screen in various modes. In one embodiment, the HMD 100 can output an image in a see-through mode. In this case, the see-through mode indicates that the display screen is transparent. The see-through mode indicates a mode capable of using content while a user wearing the HMD 100 is recognizing the surrounding environment. In another embodiment, the HMD 100 can output an image in a front-light mode. In this case, the front-light mode indicates a mode capable of displaying an image to which a light is reflected without directly projecting to eyes via such a reflector as a mirror.

And, in another embodiment, the HMD 100 can output an image in a see-closed mode. In this case, the see-closed mode indicates a mode incapable of seeing an external environment via the display screen and using contents via the display screen. The present specification is explained under an assumption that the HMD 100 displays an image in the see-through mode or the front-light mode.

According to the present specification, the display unit 110 can display an image preview interface or an image review interface. And, according to the present specification, the display unit 110 can display a display object. In this case, the display object may include a clock, a message, weather, and the like.

The camera unit 120 can take a picture of an image. More specifically, the camera unit 120 can take a picture of an image of a front direction. In this case, the front direction may correspond to a direction at which the camera unit 120 faces. And, the camera unit 120 senses an image within an view angle area and can deliver the image to the processor 140. In this case, the view angle area indicates a range of a horizontal and vertical viewing angle capable of being included in a prescribed screen in case of sensing an image. And, the camera unit 120 may correspond to a unit identical to a camera 20 depicted in FIG. 2 to FIG. 7.

The sensing unit 130 senses a surrounding environment of the HMD 100 using at least one sensor installed in the HMD 100 and can deliver the sensed result to the processor 140 in a signal form.

The sensing unit 130 can include at least one sensing means. As an embodiment, the at least one sensing means can include such a sensing means as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensing unit 130 is a common name for the aforementioned various sensing means. The sensing unit senses various inputs of a user and environment of the HDM 100 and can deliver a sensed result to the processor 140 in order for the processor to perform an operation in accordance with the sensed result. The aforementioned sensors may be included in the HMD 100 as a separate element or may be included in a manner of being integrated into at least one element.

According to the present specification, the sensing unit 130 may include an angle sensing unit 131 and an input sensing unit 132. For instance, the angle sensing unit 131 can sense a rotation angle of the HMD 100. In this case, the rotation angle may correspond to an angle of which a head of a user wearing the HMD 100 has rotated. And, the rotation angle may include a horizontal rotation angle. And, for instance, the input sensing unit 132 can detect an input signal of a user for the HMD 100. For instance, the input signal of the user may include a direct touch input and a proximity touch input. And, for instance, the input signal of the user may include a gesture input.

The processor 140 processes data, controls each of the units of the aforementioned HMD 100, and can control data transmission/reception between units. In the present specification, the processor 140 can detect a capturing signal. In case of a first capturing mode, the processor 140 can store a sensed image without performing rotation compensation. In this case, the first capturing mode may correspond to a mode providing an image preview interface. And, in case of a second capturing mode, the processor 140 can store a sensed image performed by rotation compensation. In this case, the second capturing mode may correspond to a mode not providing the image preview interface. Regarding operations of the processor 140, it shall be described in detail in FIG. 3 to FIG. 7.

As an embodiment of the present specification, operations performed by the HMD 100 can be controlled by the processor 140. For clarity, in the following description and diagrams, these operations are commonly depicted and explained in a manner that the HMD 100 performs/controls the operations.

Meanwhile, although it is not depicted in FIG. 1, the HMD 100 can include a communication unit, a power unit, a storage unit, an audio unit, and the like. The communication unit performs a communication with an external device using various protocols and can transceive a data with the external device using the various protocols. And, the communication unit can transmit/receive such a digital data as content and the like by accessing a network in wired or wireless. For instance, the communication unit can use such a communication standard as WLAN (Wireless LAN) (Wi-Fi), Wibro (Wireless broadband), Wimax (World Interoperability for Microwave Access), HSDPA (High Speed Downlink Packet Access) to access a wireless network.

The power unit is a power source connected to an internal battery or an external power supply of the HMD 100. The power unit can supply power to the HMD 100. And, the storage unit can store such various digital data as an audio, a picture, a video, an application, and the like. The storage unit may indicate such various digital data storage spaces as a flash memory, RAM (random access memory), SSD (solid state drive), and the like. The audio unit can receive/output an audio data via a microphone and a speaker.

The HMD 100 depicted in FIG. 1 is a block diagram according to one embodiment. Blocks represented in a manner of being separated indicate the logically distinguished elements of the HMD 100. Hence, the elements of the aforementioned HMD 100 can be equipped with a single chip or a plurality of chips according to the design of the device.

Figure 2:
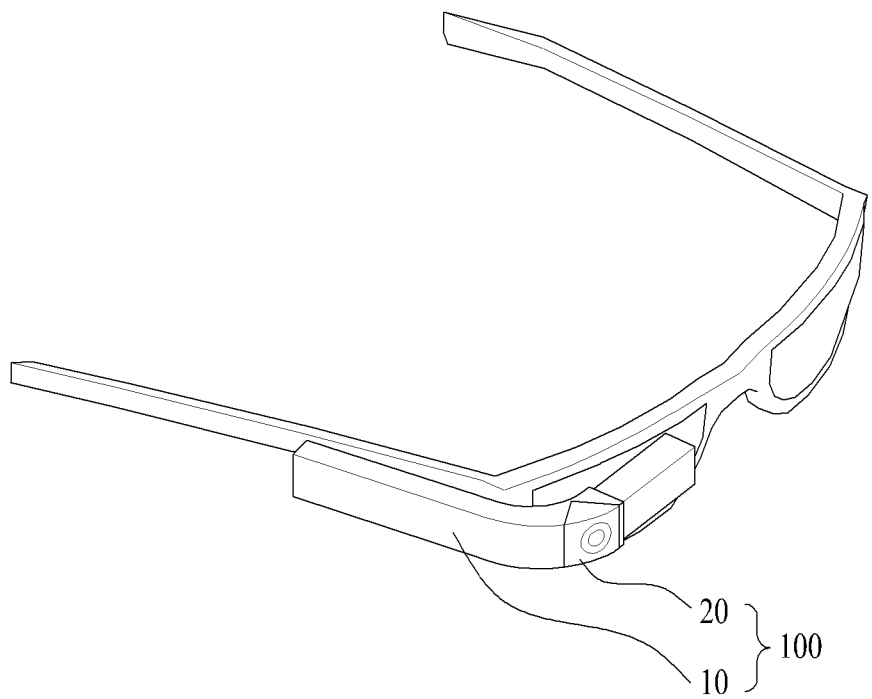
FIG. 2 is a diagram for embodiment of the HMD according to the present specification.

FIG. 2 is a diagram for embodiment of the HMD according to the present specification. More specifically, FIG. 2 indicates a body unit 10 and a camera 20 of the HMD 100.

First of all, as depicted in FIG. 2, the HMD 100 can include a body part 10. The body part 10 is a main body of the HMD 100 and may include the display unit, the sensing unit, the processor, the audio unit, and the like mentioned earlier in FIG. 1. In particular, the HMD 100 can provide an image, an application, and the like to a user via the display unit. For instance, a user may be provided with a display object, a preview of an image recognized by the camera via the display unit of the body part 10 of the HMD 100. And, the HMD 100 can detect an input signal inputted by a user via the sensing unit. For instance, the HMD 100 can detect a touch input from a user in a manner that a touch pad is installed in the body unit 10. And, the HMD 100 can detect an audio signal from a user via the audio unit.

Meanwhile, as depicted in FIG. 2, the HMD 100 may include a camera 20. As mentioned earlier in FIG. 1, the camera 20 installed in the HMD 100 can sense an image within an view angle area of a front direction. And, the camera 20 included in the HMD 100 may be detachable from/to the body unit 10. In embodiment of the present specification, assume that the camera 20 senses an image in a manner of being installed in the body unit 10.

In the following embodiments of FIG. 3 to FIG. 7, a method of providing an image sensed by the camera 20 of the HMD 100 to a user is explained.

FIG. 3 is a diagram for a first embodiment of a method of controlling the HMD according to the present specification.

Figure 3A:
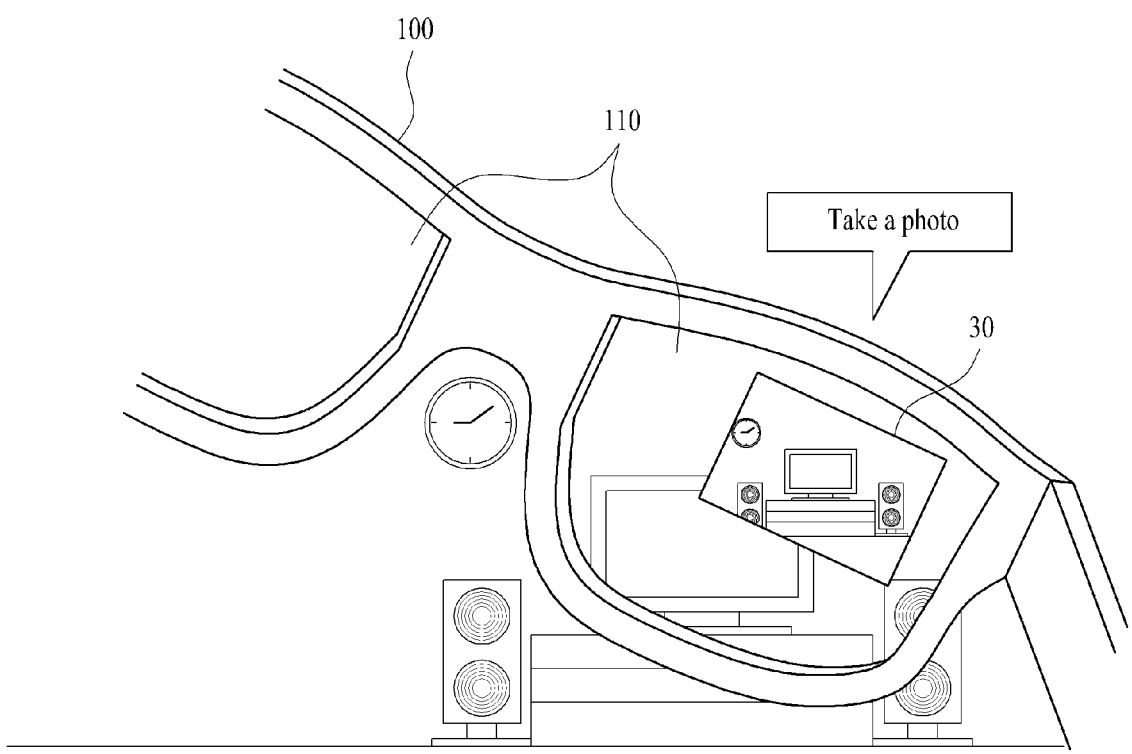
FIG. 3a and FIG. 3b are diagrams for a first embodiment of a method of controlling the HMD according to the present specification.
Figure 3B:
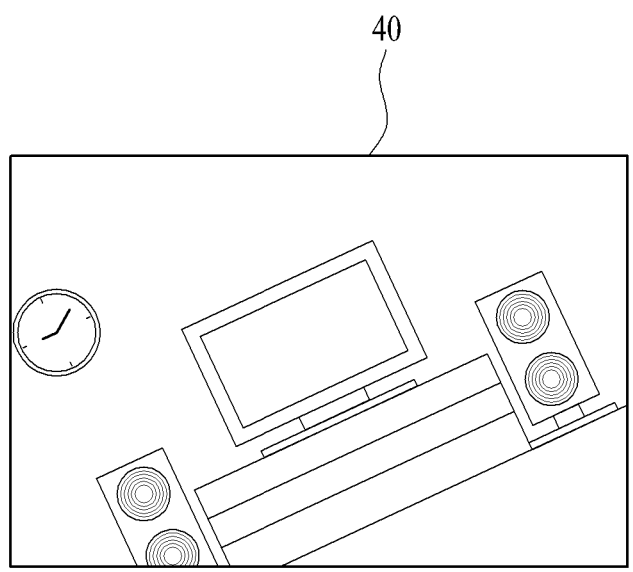

More specifically, FIG. 3a indicates an image capturing in a first capturing mode and FIG. 3b indicates an image review interface displaying a stored image.

In FIG. 3, assume that the HMD 100 is worn by a user (not depicted) and the display unit of the HMD 100 is in a see-through mode.

First of all, referring to FIG. 3a, a user wearing the HMD 100 may watch a television in a living room. And, a head of the user wearing the HMD 100 may be in a state that the head is rotated left and right on the basis of horizontality. By doing so, the HMD 100 may be in a state that the HMD is rotated left and right on the basis of horizontality similar to the head of the user. In FIG. 3a, a rotation angle of the HMD 100 may correspond to +25 degrees. In the present specification, + angle indicates a case that the HMD rotates to the right on the basis of horizontality and − angle indicates a case that the HMD rotates to the left on the basis of horizontality.

And, referring to FIG. 3a, objects positioned at the front of the HMD can be displayed in the display unit 110 of the HMD 100 as it is. In particular, a user may be in a state identical to a state that the user faces the front while wearing glasses. And, the HMD 100 can display an image preview interface 30 in the display unit 110. In particular, the HMD 100 can display the image preview interface 30 in a manner of overlaying objects recognized at the front in the display unit 110. And, the image preview interface 30 can be activated by an input signal of a user. In this case, the input signal of the user may correspond to a signal to execute a camera application. And, the input signal of the user may include a touch input, a voice input, a gesture input, and the like.

If the image preview interface 30 is activated, the HMD 100 senses an image within a view angle area of a camera (not depicted) and can display the sensed image in the image preview interface 30. In this case, the user wearing the HMD 100 can recognize the image sensed by the camera (not depicted) as well as the objects positioned at the front of the HMD via the display unit 110.

Meanwhile, if a horizontal rotation of the HMD 100 is recognized, the HMD 100 can display an indicator indicating a rotation angle of the HMD in the display unit 110. In this case, the indicator may be displayed in the display unit only. The indicator may be situated at the inside or outside of an image preview interface 30 area.

Subsequently, the HMD 100 can detect a capturing signal while the image preview interface 30 is provided. In this case, the capturing signal may correspond to a signal to capture an image. For instance, the capturing signal may correspond to a voice input signal, a touch input signal, a gesture input signal, and the like inputted to the HMD 100. Besides, the capturing signal may correspond to various signals capable of being detected by the sensing unit of the HMD 100. As depicted in FIG. 3a, the capturing signal may correspond to such a voice input signal of a user as 'take a photo'.

In this case, the HMD can obtain a rotation angle of the camera (not depicted) based on a detected capturing signal. In this case, the rotation angle of the camera may be identical to a rotation angle of the HMD 100 or a rotation angle of a user. And, a rotation angle can be obtained by the angle sensing unit mentioned earlier in FIG. 1. In FIG. 3a, the rotation angle may correspond to +25 degrees. Yet, the HMD 100 may obtain the rotation angle of the camera irrespective of whether the capturing signal is detected or not.

Next, the HMD 100 can determine a capturing mode. In particular, the HMD 100 can determine the capturing mode when a capturing signal is detected. In the present specification, the capturing mode can include a first capturing mode providing the image preview interface 30 and a second capturing mode not providing the image preview interface 30. For instance, the first capturing mode may correspond to a mode of which a camera application is executed. Referring to FIG. 3, since the image preview interface 30 is provided when a capturing signal is detected, the HMD 100 can determine the mode as the first capturing mode.

In this case, the HMD 100 can capture a sensed image based on the detected capturing signal. And, the HMD 100 can store the captured image without performing rotation compensation in the first capturing mode. For instance, when the HMD 100 is in horizontality, if the HMD stores a captured image as it is, the captured image may be identical to a rotation-compensated image. Yet, if the HMD 100 captures an image in a horizontally rotated state, the HMD 100 can store the image captured in an inclined state as it is. In particular, referring to FIG. 3a, since an image is captured in a state that the HMD is horizontally rotated to +25 degrees, the HMD 100 can store the image horizontally rotated to −25 degrees. This is because if a user captures an image sensed in a state of being rotated based on horizontality while watching the sensed image via the image preview interface 30, it may indicate that the user intends to store the image in a manner of capturing the inclined image.

As depicted in FIG. 3b, the HMD 100 can display a stored image in an image review interface 40. In this case, since the image is captured in the first capturing mode, the HMD 100 can display the image for which rotation compensation is not performed in the image review interface 40. In particular, as depicted in FIG. 3b, the HMD 100 can display the image stored without performing horizontal compensation. Although it is not depicted in FIG. 3b, the image review interface 40 can be displayed in the display unit.

Meanwhile, after displaying a previously stored image in the image review interface 40 for a predetermined time, the HMD 100 can display the image preview interface 30 again. In this case, the predetermined time can be configured in various ways and may correspond to 1 to 3 seconds. This is because the image review interface 40 corresponds to a step of temporarily checking a stored image while a camera application is executed in the first capturing mode.

According to the present embodiment, if an image is captured when a head of a user wearing the HMD 100 is not in a horizontal state in the first capturing mode, the user can obtain an image for which rotation compensation is not performed since the image is stored as it is.

Meanwhile, although it is not depicted in FIG. 3, the HMD 100 can capture a video in the first capturing mode. In particular, the HMD 100 can capture a video in a state that the image preview interface 30 is provided. In this case, although the video is captured in a state that the HMD is horizontally rotated, the HMD 100 can store the video as it is without performing rotation compensation for each frame. This is because if a user captures a video in a state of being provided with the image preview interface 30, it may indicate that the user intends to capture the video in the state that the HMD is horizontally rotated as it is.

In this case, although it is not depicted in FIG. 3, the HMD 100 can display a rotation compensation interface while capturing a video. The HMD can make a user select whether the video is continuously captured in the first capturing mode by displaying the rotation compensation interface. In one embodiment, if the rotation compensation is not selected, the HMD 100 can continuously capture the video in the first capturing mode. In another embodiment, if the rotation compensation is selected, the HMD 100 may capture the video in a state that the rotation compensation is performed after the rotation compensation interface is displayed.

Figure 4A:
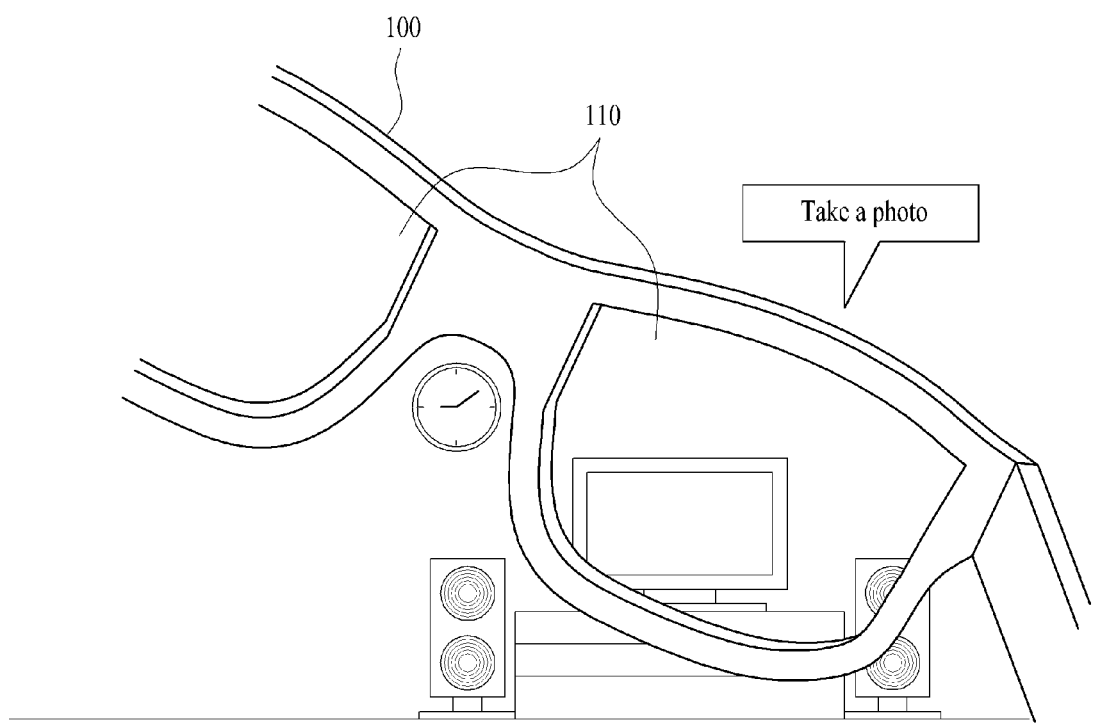
FIGS. 4a-4c are diagrams for a second embodiment of a method of controlling the HMD according to the present specification.
Figure 4B:
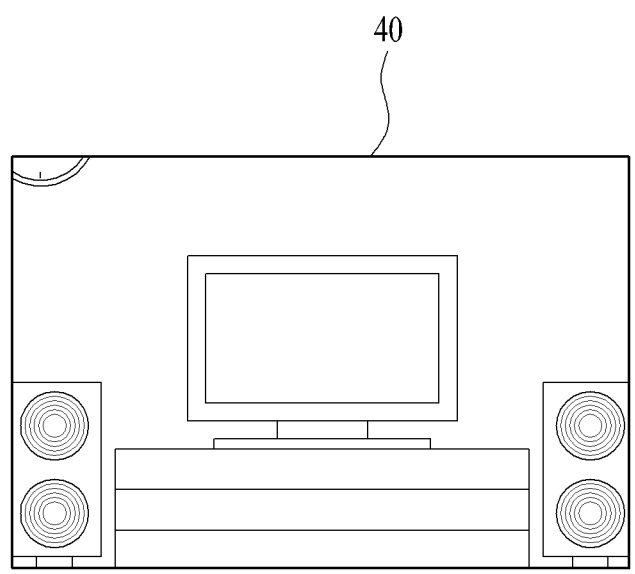
Figure 4C:
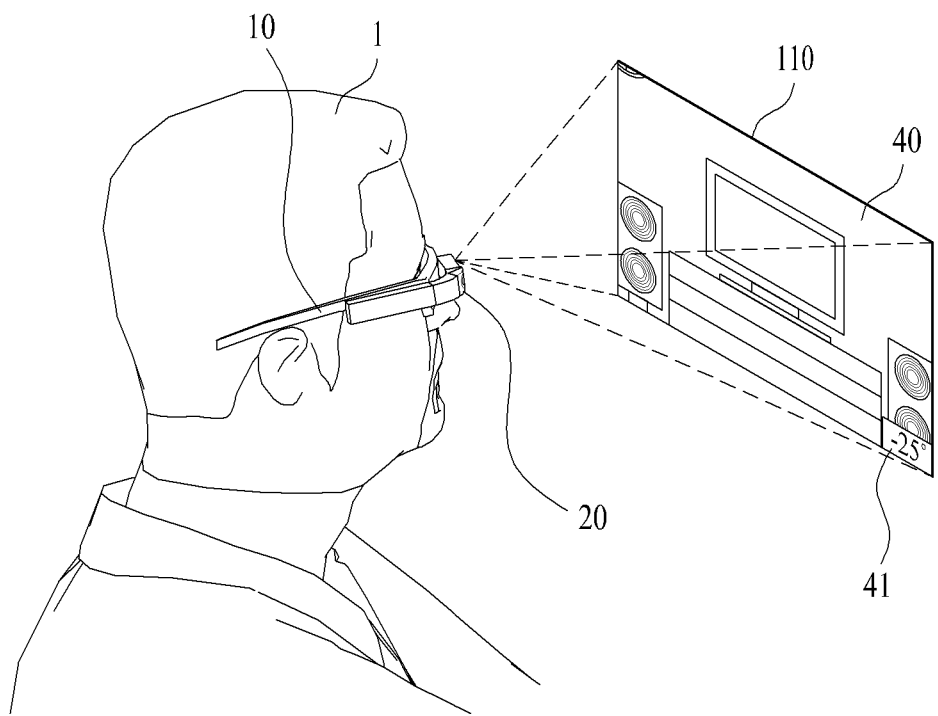

FIG. 4 is a diagram for a second embodiment of a method of controlling the HMD according to the present specification. More specifically, FIG. 4a indicates an image capturing in a second capturing mode, FIG. 4b indicates rotation compensation of a captured image, and FIG. 4c indicates an image review interface displaying a stored image.

In FIG. 4, assume the HMD 100 is worn by a user (not depicted) and the display unit 110 of the HMD 100 is in a see-through mode.

First of all, referring to FIG. 4a, a user wearing the HMD 100 may watch a television in a living room. And, a head of the user may be in a state of being rotated by an amount of +25 degrees. In this case, the HMD 100 may have a rotation angle identical to the rotation of the head of the user.

And, the HMD 100 can recognize objects, environment, or the like positioned at the front of the HMD via the display unit 110. In this case, a camera application of the HMD 100 may be in a deactivated state. Hence, unlike FIG. 3, the HMD 100 does not display an image within an view angle area of a camera in the display unit 110. In this case, although it is not depicted in FIG. 4a, the HMD 100 can display at least one of a currently executed application and various objects in the display unit 110. For instance, the HMD 100 can display such a display object as time, weather, a message, and the like in the display unit 110. In this case, a user can simultaneously recognize the objects positioned at the front of the HMD and the display object via the display unit 110. And, for instance, if the user is in the course of using an application, the HMD 100 can display the currently executed application in the display unit 110. And, for instance, the HMD 100 can display the currently executed application and the display object in the display unit 110 at the same time.

Meanwhile, the HMD 100 can detect a capturing signal. More specifically, unlike FIG. 3a, the HMD 100 can detect a capturing signal in a state that an image preview interface is not provided. And, more specifically, the HMD 100 can detect a signal to capture an image while using content irrelevant to a camera application. In this case, as mentioned in FIG. 3, an input signal can include a touch input, a voice input, a gesture input, and the like inputted to the HMD 100. In FIG. 4a, a capturing signal may correspond to such a voice input signal of a user as 'take a photo'. In this case, the HMD 100 can capture an image in a state that the image sensed by a camera 20 is not provided to a user 1.

And, the HMD 100 can obtain a rotation angle of the camera (not depicted) based on a detected capturing signal. In this case, the rotation angle of the camera may be identical to a rotation angle of the HMD 100 or a rotation angle of a user. In FIG. 4a, the rotation angle may correspond to +25 degrees. As mentioned earlier in FIG. 3, the HMD 100 may obtain the rotation angle of the camera (not depicted) before detecting the capturing signal.

In this case, the HMD 100 determines a capturing mode. More specifically, the HMD 100 can determine the capturing mode when a capturing signal is detected. As mentioned in the foregoing description, the capturing mode according to the present specification can include a first capturing mode providing an image preview interface and a second capturing mode not providing the image preview interface. Referring to FIG. 4, since the image preview interface is not provided when a capturing signal is detected, the HMD 100 can determine the capturing mode as the second capturing mode.

In this case, the HMD 100 can capture a sensed image based on the detected capturing signal. And, the HMD 100 can store the captured image by performing rotation compensation in the second capturing mode. This is because if an image is captured in a state that the image preview interface is not displayed, it may indicates that a user intends to store a horizontal image irrespective of whether the HMD 100 is inclined or not.

In particular, in order for the HMD 100 to perform rotation compensation for the captured image, crop and horizontal compensation can be performed for the captured image in accordance with frame aspect ratio. More specifically, the HMD 100 can store the captured image performed by compensation for the captured image by an amount of a rotation angle to a rotation direction of the rotation angle. In this case, the order of the incident between a crop operation and a horizontal compensation operation can be made in various ways. For instance, the horizontal compensation operation may be performed after the crop operation is performed. And, for instance, the crop operation may be performed after the horizontal compensation is performed. In this case, the frame aspect ratio can vary according to a configuration. For instance, an aspect ratio of a camera frame in terms of width to length may correspond to 5:3. And, the HMD 100 may rotate +25 degrees to perform horizontal compensation for a cropped image. And, the HMD 100 may perform resizing as well as the +25 degrees rotation for the cropped image. In this case, the resizing may indicate that the cropped image is adjusted to an original image size.

And, as depicted in FIG. 4b, the HMD 100 can display a stored image in an image review interface 40. More specifically, the HMD 100 can display the image stored in a horizontal state by performing rotation compensation for a captured image in the image review interface 40. In this case, the image displayed in the image review interface 40 may correspond to a zoomed-in image compared to a sensed image. And, although it is not depicted in FIG. 4b, the HMD 100 can display a horizontal rotation angle of the sensed image in a manner of displaying an indicator in the image review interface 40. For instance, the horizontal rotation angle of the sensed image may correspond to +25 degrees. And, the HMD 100 displays various indicators in the image review interface 40 to indicate that the sensed image is stored after performing rotation compensation is performed for the sensed image. By doing so, a user may recognize an angle of an original captured image while watching a horizontal image, which corresponds to the stored image. And, the HMD 100 displays the image review interface 40 depicted in FIG. 4b in the display unit 110 to make the user check the stored image.

Meanwhile, the HMD 100 displays the stored image in the image review interface 40 for a predetermined time and then displays at least one of a currently executed application and a display object. In particular, if an image is captured when a different application is executed or the display object is displayed, the HMD 100 temporarily shows the stored image to a user and then returns to an original state. For instance, the predetermined time can be configured in various ways and may correspond to 1 to 3 seconds.

According to the present embodiment, when an image is captured in a state that the image preview interface is not provided, a user can automatically obtain an image for which rotation compensation is performed.

Meanwhile, although it is not depicted in FIG. 4, the HMD 100 can capture a video in the second capturing mode. In particular, the HMD 100 can capture a video in a state that an image preview interface 30 is not provided. In this case, if the video is captured in a state that the HMD is horizontally rotated, the HMD can store the video in a manner of performing rotation compensation for each frame of the video. This is because if a video is captured in the state that the image preview interface 30 is not provided, it indicates that a user intends to capture the video performed by rotation compensation for a horizontally rotated image.

And, although it is not depicted in FIG. 4, when a video captured in the second capturing mode is played, the HMD 100 can display an indicator indicating a rotation angle together with the video. This is because although the video is captured in a horizontally rotated state, a user cannot recognize a rotation angle at the time of capturing the video since the video is played in a manner that rotation compensation is performed for the video.

Meanwhile, when the embodiment of FIG. 3 and the embodiment of FIG. 4 are compared to each other, an view angle of the image stored in the first capturing mode and an view angle of the image stored in the second capturing mode may be different from each other. This is because the image stored in the first capturing mode stores a captured image as it is. On the contrary, the image stored in the second capturing mode stores a captured image performed by rotation compensation for the captured image. Hence, the image stored in the first capturing mode may have wider view angle compared to the image stored in the second capturing mode.

Meanwhile, the HMD 100 may be non-limited to the embodiment of FIG. 3 and that of FIG. 4. For instance, unlike the embodiment of FIG. 3, in case of the first capturing mode providing the image preview interface, the HMD 100 can store a sensed image performed by rotation compensation for the sensed image. And, for instance, unlike the embodiment of FIG. 4, in case of the second capturing mode not providing the image preview interface, the HMD 100 can store a sensed image as it is without performing rotation compensation.

Figure 5:
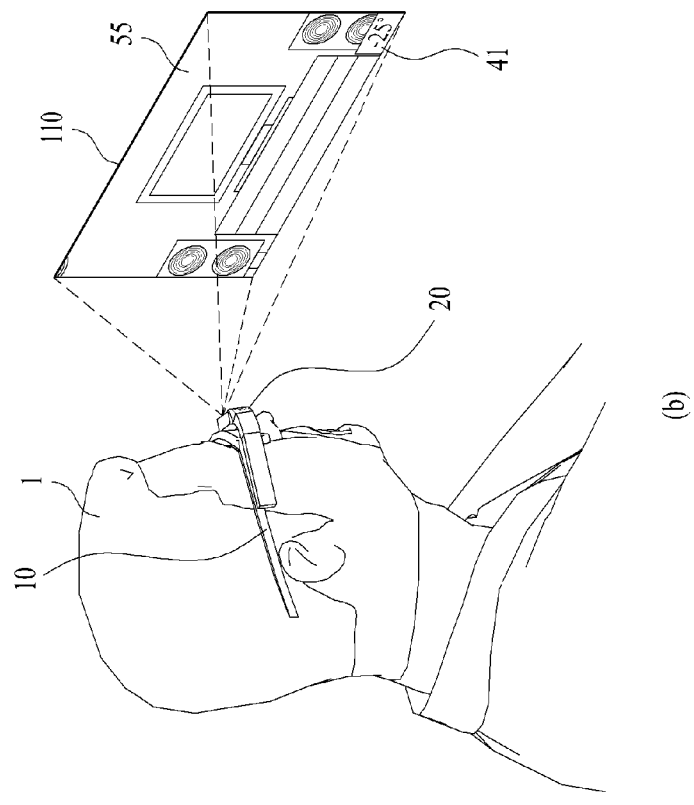
FIG. 5 is a diagram for a third embodiment of a method of controlling the HMD according to the present specification.
Figure 5:
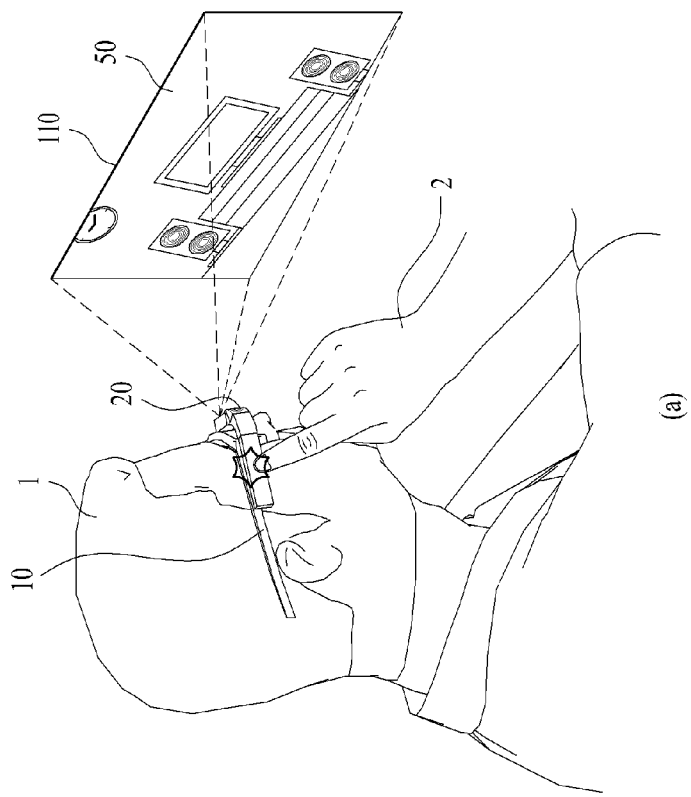

FIG. 5 is a diagram for a third embodiment of a method of controlling the HMD according to the present specification. More specifically, FIG. 5 (*a*) indicates a stored image and FIG. 5 (*b*) indicates that rotation compensation is performed for the stored image.

First of all, as depicted in FIG. 5 (*a*), a stored image 50 may correspond to an image stored as it is which is sensed by the HMD 100 in a state of being horizontally rotated. As mentioned earlier in FIG. 3, this may correspond to a case that the HMD 100 captures an image in the first capturing mode. In this case, a user 1 may want to perform rotation compensation for the image after the image is stored.

In this case, the HMD 100 can detect a first additional input signal. In one embodiment, the HMD 100 can detect the first additional input signal in a state that a gallery application providing a stored image is executed. In another embodiment, the HMD 100 can detect the first additional input signal in a state that an image review interface is displayed after an image is captured in the first capturing mode. In this case, the first additional input signal may correspond to a signal intending to perform rotation compensation for the image stored without performing the rotation compensation. For instance, the first additional input signal may correspond to a touch input signal, a voice input signal, a gesture input signal, and the like for the body unit 10 of the HMD 100. Referring to FIG. 5 (*a*), the first additional input signal may correspond to the touch input signal for the body unit 10 of the HMD 100.

Next, as depicted in FIG. 5 (*b*), the HMD 100 can perform the rotation compensation for the stored image 50 in response to the detected first additional input signal. More specifically, the HMD 100 can perform the rotation compensation for the stored image in a state of being horizontally rotated. In relation to this, as depicted in FIG. 4b, the HMD 100 can perform the rotation compensation for a captured image.

And, the HMD 100 can restore a rotation-compensated image. And, the HMD 100 can display an image 55 for which the rotation compensation is performed by the first additional input signal in the display unit 110. By doing so, the user 1 can check the rotation-compensated image.

According to the present embodiment, a horizontal image can be provided to the user 1 performed by the rotation compensation for an image where the rotation compensation is not performed.

And, although it is not depicted in FIG. 5, if the HMD 100 detects an input signal of the user 1 for a video captured in the first capturing mode, the HMD can restore the video performed by the rotation compensation for the video.

Figure 6:
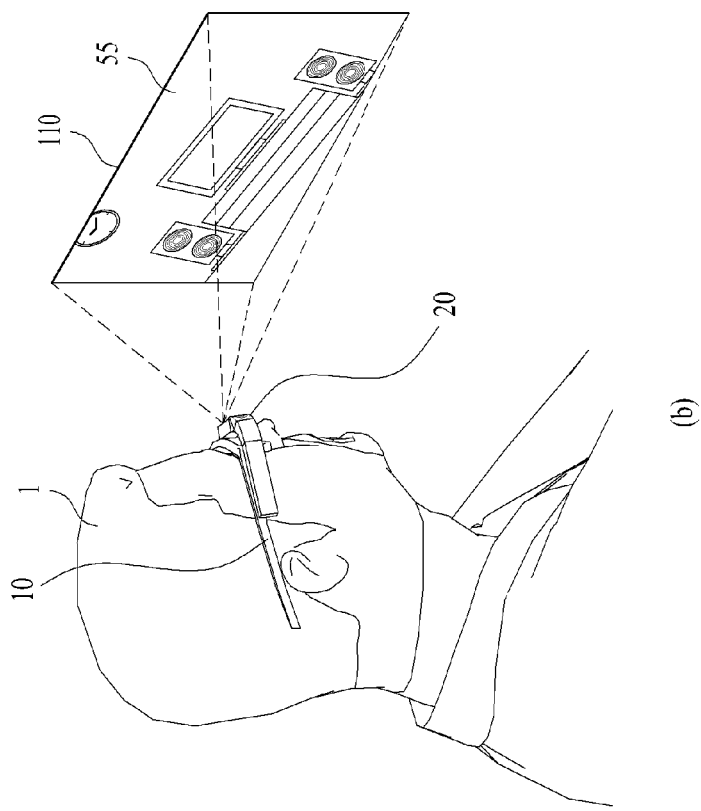
FIG. 6 is a diagram for a fourth embodiment of a method of controlling the HMD according to the present specification.
Figure 6:
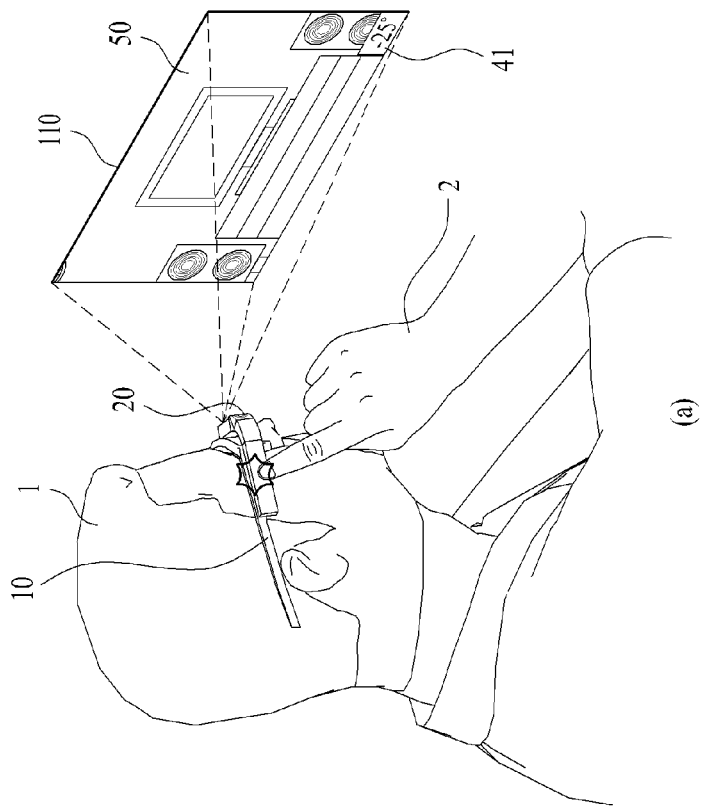

FIG. 6 is a diagram for a fourth embodiment of a method of controlling the HMD according to the present specification. More specifically, FIG. 6 (*a*) indicates a stored image and FIG. 6 (*b*) indicates that re-compensation is performed for the stored image.

First of all, as depicted in FIG. 6 (*a*), the stored image 50 may correspond to an image stored performed by rotation compensation for the image sensed by the HMD in a state of being horizontally rotated. As mentioned earlier in FIG. 4, this may correspond to a case that the HMD 100 captures an image in a second capturing mode. In this case, a user 1 may want the stored image to be returned to a state that the rotation compensation is not performed after the image is stored.

In this case, the HMD 100 can detect a second additional input signal. In one embodiment, the HMD 100 can detect the second additional input signal in a state that a gallery application providing a stored image is executed. In another embodiment, the HMD 100 can detect the second additional input signal in a state that an image review interface is displayed after an image is captured in the second capturing mode. In this case, the second additional input signal may correspond to a signal intending to return an image stored by performing rotation compensation for the image to a previous state where the rotation compensation is not performed. For instance, the second additional input signal may correspond to a touch input signal or a voice input signal for the body unit 10 of the HMD 100.

Next, as depicted in FIG. 6 (*b*), the HMD 100 can cancel rotation compensation for the image stored by performing the rotation compensation in response to the detected second additional input signal. In relation to this, as depicted in FIG. 3*b*, the HMD 100 can return the image to which the rotation compensation is performed to an image before the rotation compensation is performed.

And, the HMD 100 can restore an image 55 of which rotation compensation is cancelled. And, the HMD 100 can display the image 55 of which the rotation compensation is cancelled by the second additional input signal in the display unit 110.

According to the present embodiment, the user 1 may receive an image returned to the state that the rotation compensation is not performed from a horizontal image stored by performing the rotation compensation.

And, although it is not depicted in FIG. 6, if an input signal of the user 1 is detected in a video captured in the second capturing mode, the HMD 100 may restore the video in a manner of cancelling the rotation compensation.

Figure 7:
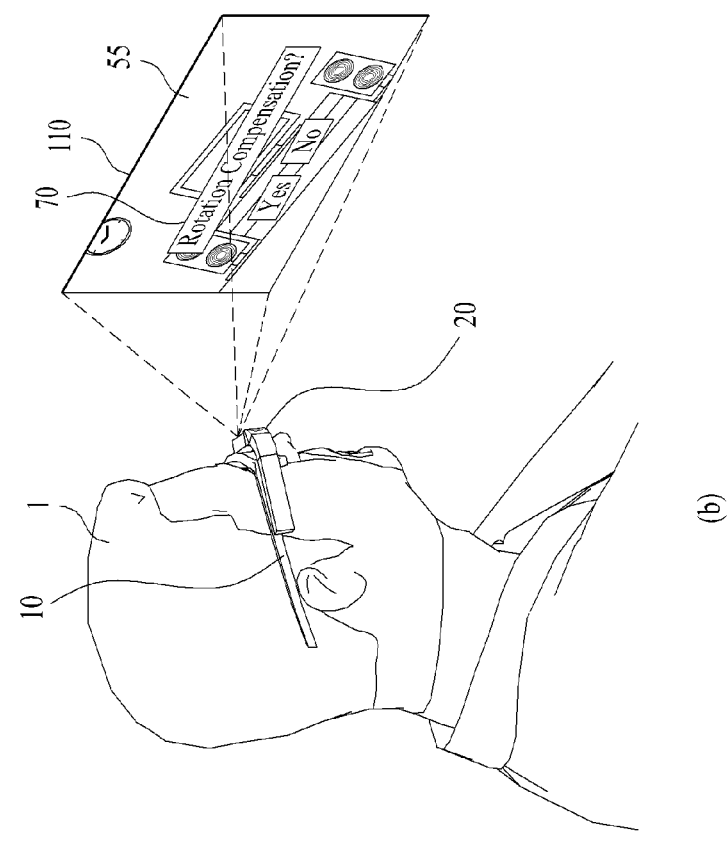
FIG. 7 is a diagram for a fifth embodiment of a method of controlling the HMD according to the present specification.
Figure 7:
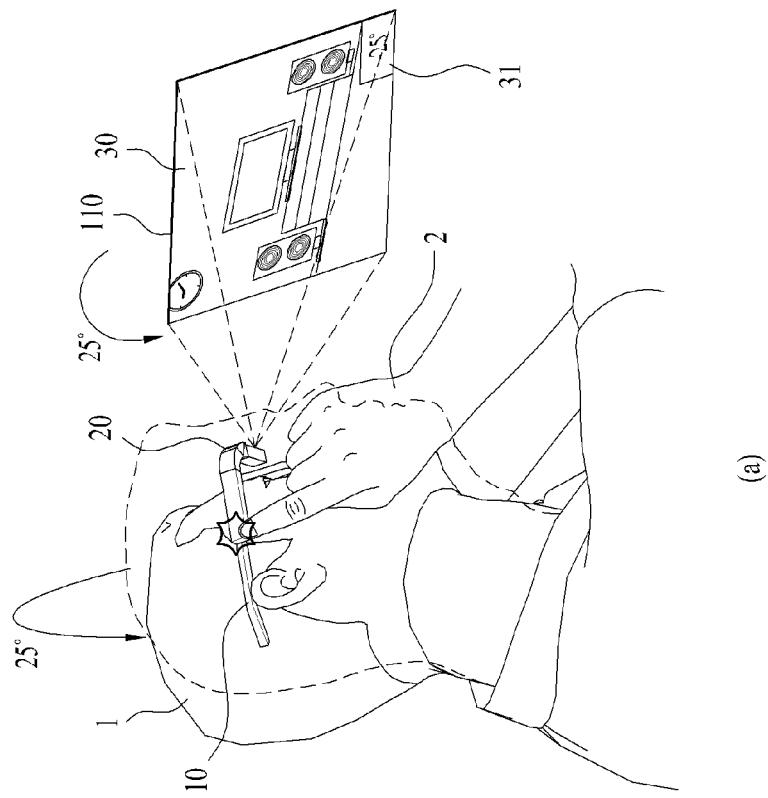

FIG. 7 is a diagram for a fifth embodiment of a method of controlling the HMD according to the present specification. More specifically, FIG. 7 (*a*) indicates an image capturing in a first capturing mode and FIG. 7 (*b*) indicates a rotation compensation interface.

First of all, as depicted in FIG. 7 (*a*), the HMD 100 can capture an image in a state of being horizontally rotated. More specifically, the HMD 100 can capture an image in the state of being horizontally rotated when a user 1 recognizes a sensed image in a manner that an image preview interface 30 is provided in the display unit 110. In this case, as mentioned earlier in FIG. 3, the HMD 100 can recognize this mode as the first capturing mode.

Yet, unlike FIG. 3, although the HMD is in the first capturing mode, the HMD 100 can provide a rotation compensation interface 70 to a user instead of storing a sensed image as it is without performing rotation compensation. In particular, although the HMD 100 is in the first capturing mode, the HMD can make the user 1 select whether the rotation compensation is performed for a captured image. For instance, as depicted in FIG. 7 (*b*), the HMD can display a rotation compensation interface 70 on the captured image.

In this case, referring to FIG. 7 (*b*), if an input signal for 'Yes' is detected, the HMD 100 can store a captured image identical to the image captured in the second capturing mode mentioned earlier in FIG. 4 performed by rotation compensation. And, if an input signal for 'No' is detected, the HMD 100 can store an image identical to the image captured in the first capturing mode mentioned earlier in FIG. 3 as it is. In this case, the input signal for 'Yes' or 'No' may include a gesture input, a touch input, a voice input, and the like of the user 1.

According to the present embodiment, although an image is captured in the first capturing mode, the user 1 can select whether rotation compensation for the image is performed in accordance with a taste of the user.

Meanwhile, although it is not depicted in FIG. 7, in case of a video capturing mode, the HMD 100 can provide the rotation compensation interface 70 depicted in FIG. 7 (*b*) when a horizontal rotation is recognized. By doing so, the user 1 can determine whether a video is stored by performing rotation compensation in consideration of a horizontal rotation or stored as it is while the video is captured.

Figure 8:
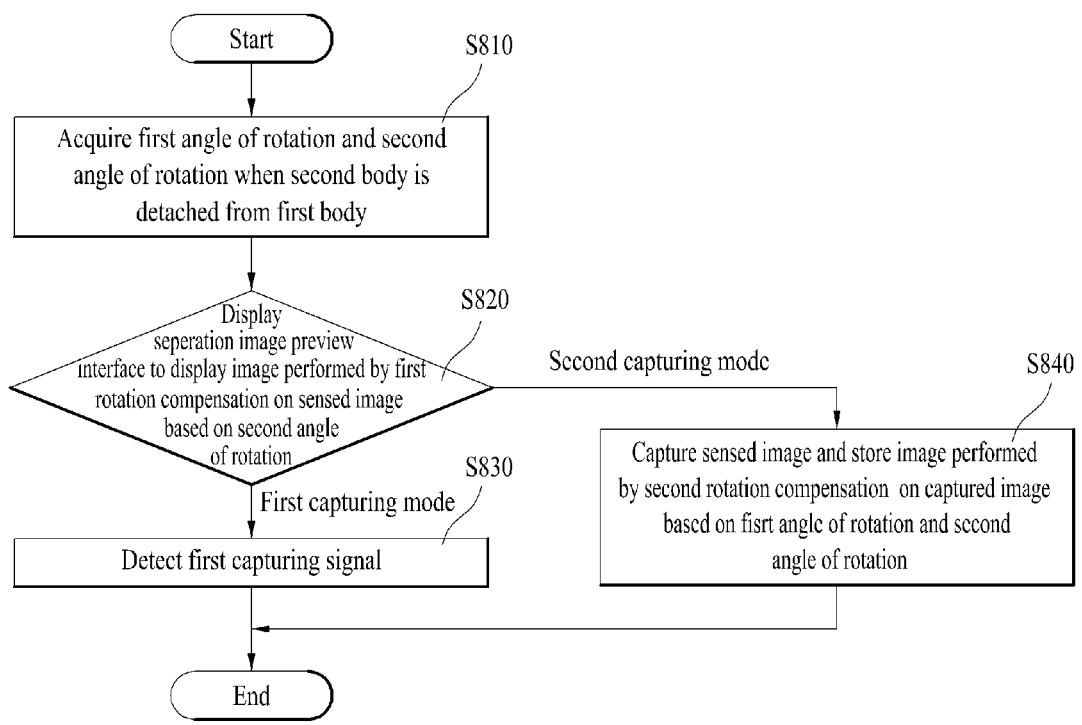
FIG. 8 is a flowchart for a method of controlling the HMD according to the present specification.

FIG. 8 is a flowchart for a method of controlling the HMD according to the present specification. Each step of FIG. 8 can be controlled by the processor 140 of the display device 100 depicted in FIG. 1.

First of all, the HMD can detect a capturing signal [S810]. As mentioned earlier in FIG. 3 and FIG. 4, the capturing signal may include a voice input, a touch input, and the like of a user.

Next, the HMD can determine whether a mode corresponds to a first capturing mode or a second capturing mode [S820]. In this case, the first capturing mode may correspond to a mode providing an image preview interface and the second capturing mode may correspond to a mode not providing the image preview interface. And the image preview interface indicates an interface showing a sensed image to a user when a camera application is executed.

In the step S820, if the first capturing mode is determined to use, the HMD can store the sensed image without performing rotation compensation. As mentioned earlier in FIG. 3, if the image preview interface is not provided when a capturing signal is detected, the HMD can recognize it as the first capturing mode. In this case, although the sensed image is a horizontally rotated image, the HMD can store the image as it is without performing separate rotation compensation.

Meanwhile, in the step S820, if the second capturing mode is determined to use, the HMD can store the sensed image performed by rotation compensation for the sensed image. As mentioned earlier in FIG. 4, if the image preview interface is not provided when a capturing signal is detected, the HMD can recognize it as the second capturing mode. In this case, if the sensed image is a horizontally rotated image, the HMD can store the image performed by rotation compensation.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A head mounted display and a method of controlling therefor according to one embodiment of the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a head mounted display can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementally applied, if necessary.

What is claimed is:

1. A head mounted display (HMD), comprising:
a display unit configured to display visual information;
a camera unit configured to sense an image;
an angle sensing unit configured to sense a rotation angle of the camera unit;
an input sensing unit configured to detect an input signal and transmit a detected result to a processor; and
the processor configured to control the display unit, the camera unit, the angle sensing unit, and the input sensing unit,
wherein the processor is further configured to:
detect a capturing signal,
store a sensed image without performing rotation compensation if a mode correspond to a first capturing mode, wherein the first capturing mode corresponds to a mode providing an image preview interface, and
store the sensed image performed by the rotation compensation if a mode correspond to a second capturing mode, wherein the second capturing mode corresponds to a mode not providing the image preview interface.

2. The HMD of claim 1, wherein the processor is further configured to:

store the sensed image without performing the rotation compensation if the mode corresponds to the first capturing mode when the capturing signal is detected, and
store the sensed image performed by the rotation compensation if the mode corresponds to the second capturing mode when the capturing signal is detected.

3. The HMD of claim 1, wherein the processor is further configured to:
obtain the rotation angle of the camera unit in response to the detected capturing signal, and
store the sensed image performed by the rotation compensation by an amount of the rotation angle in a rotation direction of the rotation angle.

4. The HMD of claim 1, wherein the processor is further configured to display a rotation compensation interface determining whether the rotation compensation is performed for an image when the capturing signal is detected.

5. The HMD of claim 1, wherein the capturing signal corresponds to a signal to capture an image.

6. The HMD of claim 5, wherein the processor is further configured to:
detect a first additional input signal, and
perform the rotation compensation for the image stored without performing the rotation compensation in response to the detected first additional input signal.

7. The HMD of claim 5, wherein the processor is further configured to:
detect a second additional input signal, and
cancel the rotation compensation for the image stored by performing the rotation compensation in response to the detected second additional input signal.

8. The HMD of claim 5, wherein the processor is further configured to provide an image review interface displaying the stored image.

9. The HMD of claim 8, wherein the processor is further configured to provide the image preview interface after the image review interface is provided for a predetermined time if the mode corresponds to the first capturing mode.

10. The HMD of claim 8, wherein the processor is further configured to display at least one of a currently executed application and a display object after the image review interface is provided for a predetermined time if the mode corresponds to the second capturing mode.

11. The HMD of claim 1, wherein the capturing signal corresponds to a signal to capture a video.

12. The HMD of claim 11, wherein the processor is further configured to:
store a captured video performed by the rotation compensation if the mode corresponds to the second capturing mode, and
display an indicator indicating the rotation angle.

13. The HMD of claim 11, wherein the processor is further configured to display a rotation compensation indicator while capturing the video if the mode corresponds to the first capturing mode.

14. The HMD of claim 1, wherein the processor is further configured to display an indicator indicating the rotation compensation of the image if the mode corresponds to the second capturing mode.

15. The HMD of claim 1, wherein the processor is further configured to display an indicator indicating the rotation angle of the camera unit in the image preview interface.

16. The HMD of claim 1, wherein the capturing signal comprises a voice input signal, a touch input signal, and a gesture input signal.

17. The HMD of claim 1, wherein a view angle of an image stored in the first capturing mode and a view angle of an image stored in the second capturing mode are different from each other.

18. The HMD of claim 1, wherein the first capturing mode corresponds to a mode indicating that a camera application is currently executed.

19. The HMD of claim 1, wherein the second capturing mode corresponds to a mode indicating that at least one of a currently executed application and a display object is displayed in the display unit.

20. A method of controlling a head mounted display (HMD), comprising the steps of:
- detecting a capturing signal;
- storing a sensed image without performing rotation compensation if a mode corresponds to a first capturing mode, wherein the first capturing mode corresponds to a mode providing an image preview interface; and
- storing the sensed image performed by the rotation compensation if a mode corresponds to a second capturing mode, wherein the second capturing mode corresponds to a mode not providing the image preview interface.

* * * * *